(12) United States Patent
Clerc

(10) Patent No.: US 10,816,313 B2
(45) Date of Patent: Oct. 27, 2020

(54) ANGLE BISECTOR GAUGE

(71) Applicant: Gregory A. Clerc, Chattaroy, WA (US)

(72) Inventor: Gregory A. Clerc, Chattaroy, WA (US)

( * ) Notice: Subject to any disclaimer, the term of this patent is extended or adjusted under 35 U.S.C. 154(b) by 155 days.

(21) Appl. No.: 15/916,066

(22) Filed: Mar. 8, 2018

(65) Prior Publication Data

US 2018/0195850 A1 Jul. 12, 2018

Related U.S. Application Data

(62) Division of application No. 14/735,027, filed on Jun. 9, 2015, now Pat. No. 9,989,346.

(51) Int. Cl.
| | | |
|---|---|---|
| *G01B 3/56* | (2006.01) | |
| *B27B 27/08* | (2006.01) | |
| *B27G 5/02* | (2006.01) | |

(52) U.S. Cl.
CPC ............... *G01B 3/56* (2013.01); *B27B 27/08* (2013.01); *B27G 5/02* (2013.01)

(58) Field of Classification Search
CPC . B27G 5/02; B27G 5/023; B27G 5/04; B27G 23/00; B27B 27/08; G01B 3/56; G01L 35/0009
See application file for complete search history.

(56) References Cited

U.S. PATENT DOCUMENTS

| | | |
|---|---|---|
| 361,243 A | 4/1887 | Struble |
| 956,356 A | 4/1910 | Humbert |
| 1,410,196 A | 3/1922 | Krivacs |
| 1,660,578 A | 2/1928 | Reppell |
| 2,259,619 A | 10/1941 | Cooper |
| 3,498,345 A | 3/1970 | Sexton |
| 3,562,919 A | 2/1971 | Green |
| D274,414 S | 6/1984 | Audsley |
| 4,527,341 A | 7/1985 | Schon |
| 5,473,821 A * | 12/1995 | DiMarco ................. B27B 27/06 33/456 |
| 6,095,024 A * | 8/2000 | Brutscher ............ B23D 45/105 144/253.1 |
| 7,003,891 B1 * | 2/2006 | Diggle, III ............. B23Q 9/005 33/424 |
| 7,886,452 B1 | 2/2011 | Russo |

(Continued)

OTHER PUBLICATIONS

Office Action for U.S. Appl. No. 14/735,027, dated Sep. 21, 2017, Clerc, "Angle Bisector Gauge", 10 pages.

(Continued)

*Primary Examiner* — David P Bryant
*Assistant Examiner* — Christine Bersabal
(74) *Attorney, Agent, or Firm* — Lee & Hayes, P.C.

(57) ABSTRACT

An angle measuring gauge incorporates four arms pivotally connected to form a quadrilateral. The arms are connected to a guide bar that attaches to the quadrilateral along a diagonal and forms an axis of symmetry. A first corner of the quadrilateral is pivotally attached to the guide bar and the opposite corner of the quadrilateral is pivotally connected and is slidable along the guide bar to adjust the angles of the quadrilateral. In practice, the first corner of the quadrilateral is adjusted to conform to a desired angle, and the guide bar bisects the angle formed by the first corner and can be used to either ride in a miter slot of a cutting tool, or adjust a miter gauge of a cutting tool to cut accurate miters.

4 Claims, 6 Drawing Sheets

(56) References Cited

U.S. PATENT DOCUMENTS

2013/0291392 A1 11/2013 Swamy et al.
2016/0363429 A1 12/2016 Clerc

OTHER PUBLICATIONS

Stanley Angle Divider No. 30, retrieved from <<http://jonzimmersantiquetools.com/features/no_30.jpg>> and <<http://home.comcast.net/~kvaughn65/stanley_30.jpg>>, available as early as Sep. 26, 2001, 2 pages.

* cited by examiner

ANGLE BISECTOR GAUGE

CROSS REFERENCE TO RELATED APPLICATION

This patent application is a divisional of and claims priority to co-pending and co-owned U.S. patent application Ser. No. 14/735,027, filed Jun. 9, 2015, entitled "ANGLE BISECTOR GAUGE," which is hereby incorporated in its entirety by reference.

BACKGROUND

When making angled cuts on picture frames or trim boards to form a mitered joint, there are many opportunities for error to creep into a process that requires precision to achieve a pleasing result. When cutting chair rail boards for a house, for example, a carpenter must measure a corner formed by two intersecting walls, calculate the half angle of that intersection, transfer the calculated angle to a miter saw or a miter gauge on a table saw and cut two boards at perfect angles in an attempt to assemble those two boards to form an acceptable mitered joint that has the same angle as the corner formed by the intersecting walls. The traditional methods used to form mitered joints oftentimes do not allow for acceptable results without some trial and error. This is due, in part, to the inaccuracy in the tools used to measure the corner, a chance for error when calculating the proper angle based on the measured corner, additional inaccuracy in setting up the saw or the gauge to the proper calculated angle, and an even further chance for inaccuracy when cutting the boards. The problem is compounded in situations where many mitered joints are required to be used in combination to frame around an object, such as a picture frame or other multi-sided object. Consequently, there is an opportunity for improved tools and methods for measuring and cutting accurate angles for mitered joints.

SUMMARY

According to various features and advantages described herein, some embodiments relate to an apparatus having a guide bar configured for slideable engagement within a channel formed in a table of a tool (e.g., a miter slot). The guide bar may have a slot formed down the center of a longitudinal axis of the guide bar, the slot may extend only partway down the center of the guide bar. A pair of angle arms each has a vertex end at which they are joined together, and a second end. The vertex end of the angle arms may be pivotally connected together, such as by a suitable fastener. The vertex end may also be pivotally connected to an end of the guide bar.

A pair of support arms each has a first end and a second end, the first end of the support arms may be pivotally connected to the second end of the angle arms. The angle arms may also be pivotally connected to each other and further connected to the guide bar by a slideable connector that passes through the second end of each support arm and also passes through the slot in the guide bar. The slideable connector may be able to slide within the slot of the guide bar to adjust the angle formed by the angle arms at their vertex ends.

The slideable connector may include a threaded fastener and a threaded knob (e.g., nut, knurled knob, wingnut, or other suitable device that engages with the threaded fastener) on the slideable connector configured to be tightened down to inhibit the slideable connector from moving within the slot of the guide bar when tightened.

Some embodiments may also include a scale disposed on the guide bar configured to display an angle formed by the angle arms at their vertex ends. Suitable scales include a semi-circular angle scale, such as a protractor scale or a Vernier scale. The length of each angle arm may be substantially the same. Similarly, the length of each support arm may be substantially the same.

In some embodiments, the apparatus is symmetrical about the longitudinal axis of the guide bar. In other words, the longitudinal axis of the guide bar divides the device into a right half and a left half, and the right half and the left half are substantially identical. In some instances, the length of each support arm is equal to the length of each angle arm.

The slot in the guide bar may be ⅛" wide and passes through a thickness of the guide bar, and is thus sized and shaped to allow a standard thickness blade of a table saw to pass through the slot.

According to a method of using the disclosed device, a novel method of forming miter joints is disclosed. In particular, using an angle measurement tool having at least two arms, the two arms of the angle measurement tool can be conformed to a desired angle by abutting the angle measurement tool against a corner. Once the angle measurement tool is set to the desired angle, the tool can be aligned with the blade of a saw in any suitable manner. For example, the tool may be aligned with the blade of a saw by inserting a portion of the tool into a miter slot of the table top of the saw. Alternatively, the tool may be aligned to the blade by abutting the tool against the blade, or by inserting a portion of the blade into a slot formed in the tool.

A first workpiece can be advanced, using the angle measurement tool, to the blade to cut the first workpiece. Additionally, a second workpiece can be advanced, using the angle measurement tool, to the blade to cut the second workpiece. The first and second workpieces can then be joined to create the desired mitered joint having the desired angle.

Once the two arms are conformed to the desired angle, a threaded fastener may be tightened to lock the angle measurement tool into its desired configuration. Rather than using the angle measurement tool to advance a workpiece to the blade, the angle measurement tool may optionally be used to align a miter gauge to one of the two arms and the miter gauge can then be used to advance a workpiece to the blade to make an angled cut.

According to another embodiment, a first arm is pivotally connected to a second arm, the second arm pivotally connected to a third arm, the third arm pivotally connected to a fourth arm, the fourth arm pivotally connected to the first arm. The arms will form a quadrilateral. There may also be a guide bar extending diagonally across the quadrilateral and forming an axis of symmetry of the quadrilateral from the connection of the first arm and the second arm through the connection of the third arm and the fourth arm. In some instances, the first arm and the second arm are pivotally connected to the guide bar. Additionally, the third arm and fourth arm may be pivotally connected together and also have the connector extending through a slot formed in the guide bar to create a slideable connection.

This may be accomplished by using a threaded fastener that fits through the slot in the guide bar and further extends through apertures in the third arm and the fourth arm. A threaded retaining member may be engaged with the threaded fastener to inhibit the threaded fastener from sliding within the slot formed in the guide bar when the threaded retaining member is tightened. In some embodiments, the guide bar is sized and configured to be slidably disposed within a channel formed in a table of a cutting tool (e.g. a miter slot in the table of a power tool).

In some instances, the quadrilateral formed by the four arms is in the geometric shape of a kite formed by the first arm and the second arm having equal lengths and the third arm and the fourth arm having equal lengths. The slot formed in the guide bar may be configured to accept the blade of a saw that allows the guide bar to be aligned with the blade of the saw.

The device may include a semi-circular scale on the guide bar to indicate the angle formed by the first arm and the second arm. In some instances the semi-circular scale is a Vernier scale.

Optionally, the pivotal connections between the first arm, second arm, third arm, and fourth arm use threaded fasteners and a cooperating threaded retaining member to inhibit relative movement between the four arms when the retaining members are tightened.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3a is a cross-sectional view along the line 3a-3a of FIG. 3.

DETAILED DESCRIPTION

Figure 1:
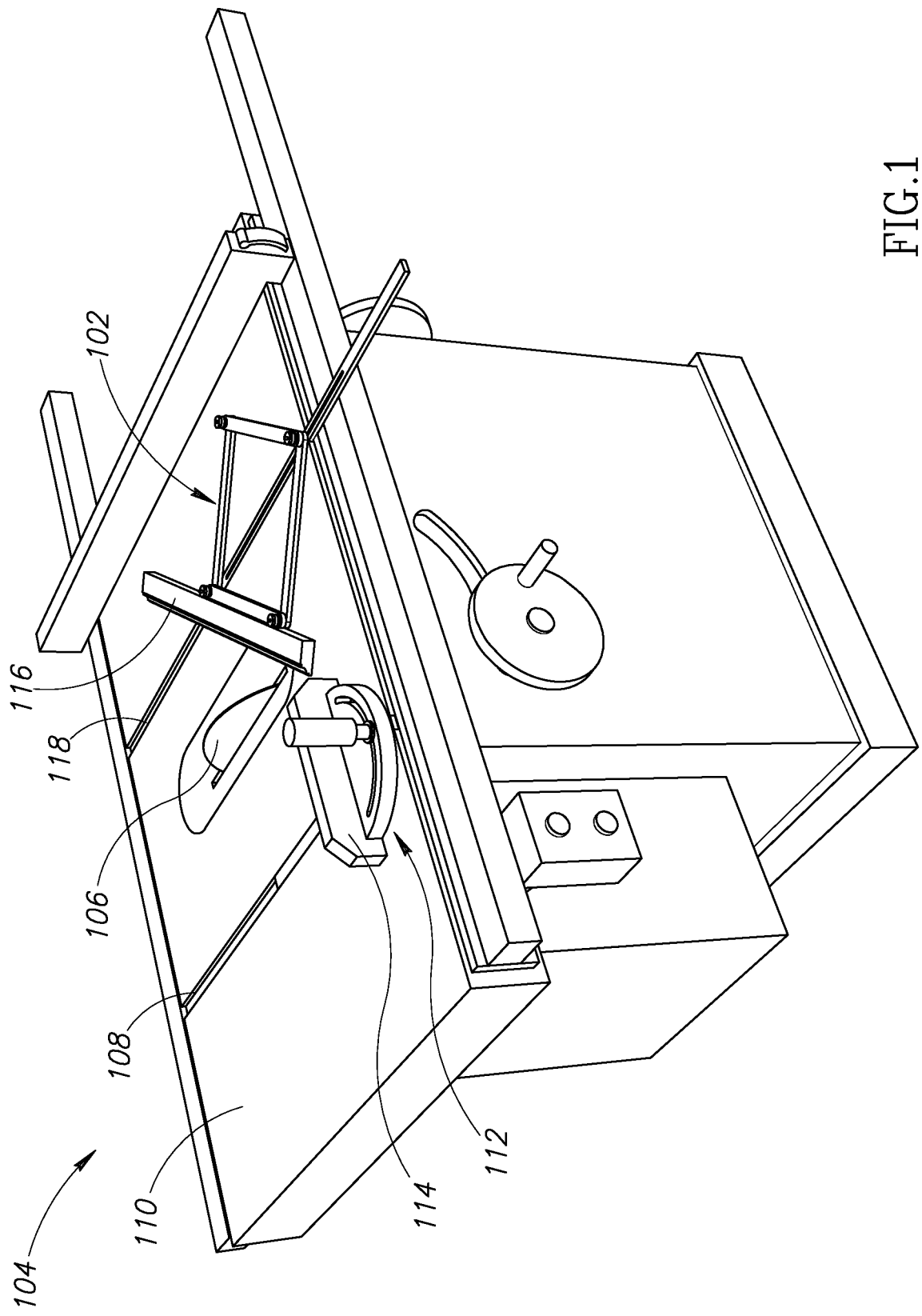
FIG. 1 is a perspective view illustrating an angle bisector gauge disposed within a miter slot of a table saw.

In the fields of carpentry and woodworking, there arise many occasions where the woodworker must measure angles and make precise cuts on two boards so they will mate together to form an accurate mitered joint. This is especially true when making frames, such as for pictures, widows, or other items that can benefit from a mitered frame, or such as when doing finish carpentry on a house, such as cutting and installing baseboard, chair rail, panel moldings, or other decorative moldings that can be applied to walls or ceiling of a building. A mitered joint is one in which two mating pieces have their ends cut at an angle and the angled cuts are mated together. For example, when making a rectangular picture frame, the corners of the frame are typically 90°. Accordingly, to form one corner of the picture frame, two workpieces may have their ends cut at 45° angles and the angled cuts are mated together to form a 90° corner of the frame. While many tasks require mitered joints that form 90° corners, there are several occasions where an angle other than 90° is desirable.

For example, the intersection between two walls of a building may not be precisely ninety degrees, and therefore, forty-five degree mitered cuts will not be accurate when assembled in a corner that is not exactly a ninety-degree corner. This is the result of building practices that use lumber that is prone to warp and twist thereby resulting in walls that may not be straight or plumb.

Moreover, where a finish carpenter needs to add trim surrounding a window that is not rectangular, such as an octagonal window, he/she must be very precise when measuring the angles, calculating the miter angle, setting up the tool to make the mitered cuts, and making the cuts.

On a standard octagonal window, for example, adjacent edges of a perfect octagon form a 135° internal angle. Therefore, in order to cut mitered trim pieces, each piece will need to be cut to exactly half of the angle, or 67.5° and at a precise length in order to form tight fitting mitered joints that combine to form the eight 135° angles around the perimeter of the octagonal window. However, typical window framing is not very precise and the framing members surrounding the window may be off a considerable amount, and thus each corner may not be exactly 135°, which necessitates a precise measurement and cut in order to arrive at tight mitered corners around the entire window.

While there are protractors, adjustable triangles, and other angle measuring devices available to allow a carpenter to measure the angles with some degree of accuracy, the carpenter still needs to calculate a precise angle at which two mating boards need to be cut to result in the proper angle once assembled. Moreover, there is ample opportunity to introduce a great deal of inaccuracy when taking a calculated angle and applying it to a saw to make the cut. For example, there are digital protractors that can accurately measure an angle to a tenth of a degree. However, when setting up a saw to make the cut, the saw may only have markings that are delineated to the nearest one degree, thereby making the resolution and precision of the tool only as accurate as one-half of a degree. In most cases, these type of cuts will be made on either a miter saw or a table saw.

A miter saw (also referred to as a chop saw, compound miter saw, sliding compound miter saw, etc.) can be adjusted to make angled cuts by pivoting the motor and saw blade about a vertical axis relative to a fixed fence to arrive at the desired angle of cut. That is, the workpiece is held against the fence, and the blade is pivoted to form an angle between the blade and the fence. The motor is started and the spinning blade of the miter saw is brought down to cut through the workpiece at the desired angle.

With reference to FIG. 1, a table saw 104, on the other hand, has a fixed blade 106 (i.e., the blade and/or motor do not pivot relative to the fence) that is parallel to one or more miter slots 108 formed in the table 110 of the table saw 104. The miter slots 108 are channels formed in the table 110 of the table saw 104 and are aligned parallel to other miter slots 108 and parallel to the blade 106. A miter gauge 112 rides in the miter slot 108 and has an adjustable miter gauge fence 114 that can be pivoted relative to the miter slot 108 (and thus the blade) to form a desired angle between the miter gauge fence 114 and the blade 106. The workpiece 116 can be held against the miter gauge fence 114 and the miter gauge 112 with the workpiece 116 is then pushed along the miter slot 108 and past the spinning blade 106 to make the desired angled cut.

Consequently, typical methods and tools for constructing mitered joints require a worker to measure the desired angle, calculate the proper miter cut, adjust the tools to make the proper angled cuts, and then make the cuts on multiple workpieces 116, such as molding or trim. Thus, not only are there many opportunities for error, the error can be multiplied by the numerous steps it takes to measure, calculate, set up a tool for the cut, and make the necessary cuts on the mating workpieces 116.

Continuing with the octagonal window example, even if the measurements and calculations are precise, if the saw that is set up to make the mitered cuts is off by one half of a degree, that error is multiplied by the 16 cuts necessary to fit the eight pieces of trim around the window. As a result, as the trim pieces are installed one by one, the final trim piece will be off by eight degrees from the initial piece, which creates an unacceptable gap where there should be a tight mitered joint.

As illustrated in FIG. 1, an angle bisector gauge 102 can remove a significant amount of guesswork, calculation, and error out of the process of measuring, adjusting, and cutting multiple pieces. As described herein, the angle bisector gauge 102 can be used to accurately measure a corner. In fact, the angle bisector gauge 102 can be used to conform to the exact angle that needs to be reproduced by a mitered joint without any measuring. The angle bisector gauge 102 can then be used at a table saw 104 to cut workpieces 116 to the exact miter angle required. The result is that any measuring, calculating, and adjusting of tools to make appropriate angled cuts can be largely eliminated.

The angle bisector gauge 102 can be used to conform to any interior angle (e.g., angles less than 180°), such as, for example, angles formed by intersecting walls and the corners of windows and/or door jams. The angle bisector gauge 102 can also be used to conform to exterior angles, as will be discussed in further detail.

The angle bisector gauge 102 can additionally be used for other materials other than for wood or wood-composites. For example, the angle bisector gauge 102 and methods discussed herein may be equally applicable to working with metal, plastics, composites, and masonry, for example. In fact, any application that may benefit from accurate measuring and cutting of angles may be improved through the use of the angle bisector gauge 102 described herein. While several examples used throughout this disclosure will focus on cutting wood, such as trim boards, construction lumber, and picture framing materials, these examples should not be construed as limiting, but rather, are merely illustrative examples intended to provide a possible context for application of the systems, tools, and methods disclosed herein.

Figure 2:
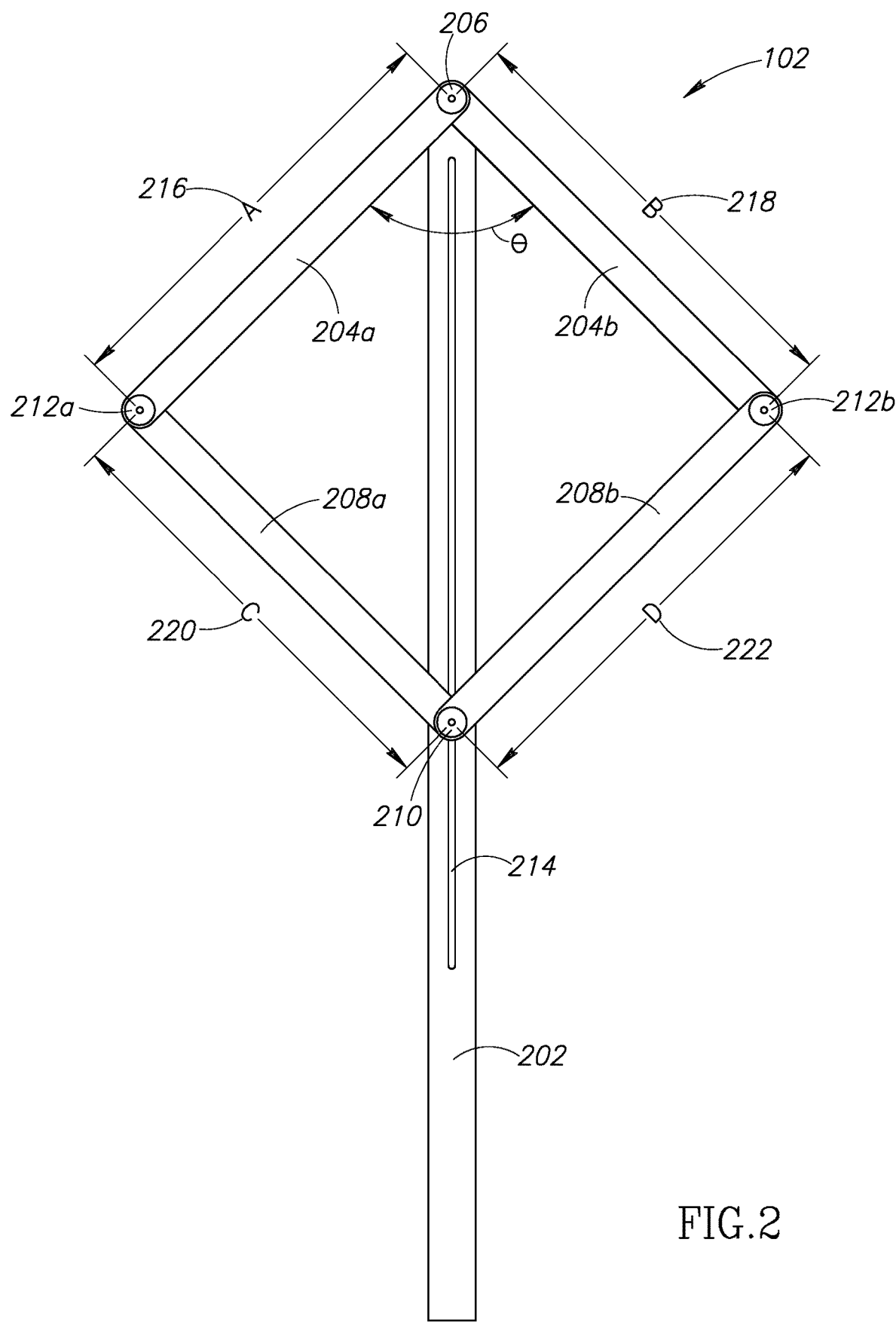
FIG. 2 is a plan view illustrating an embodiment of an angle bisector gauge.
Figure 3:
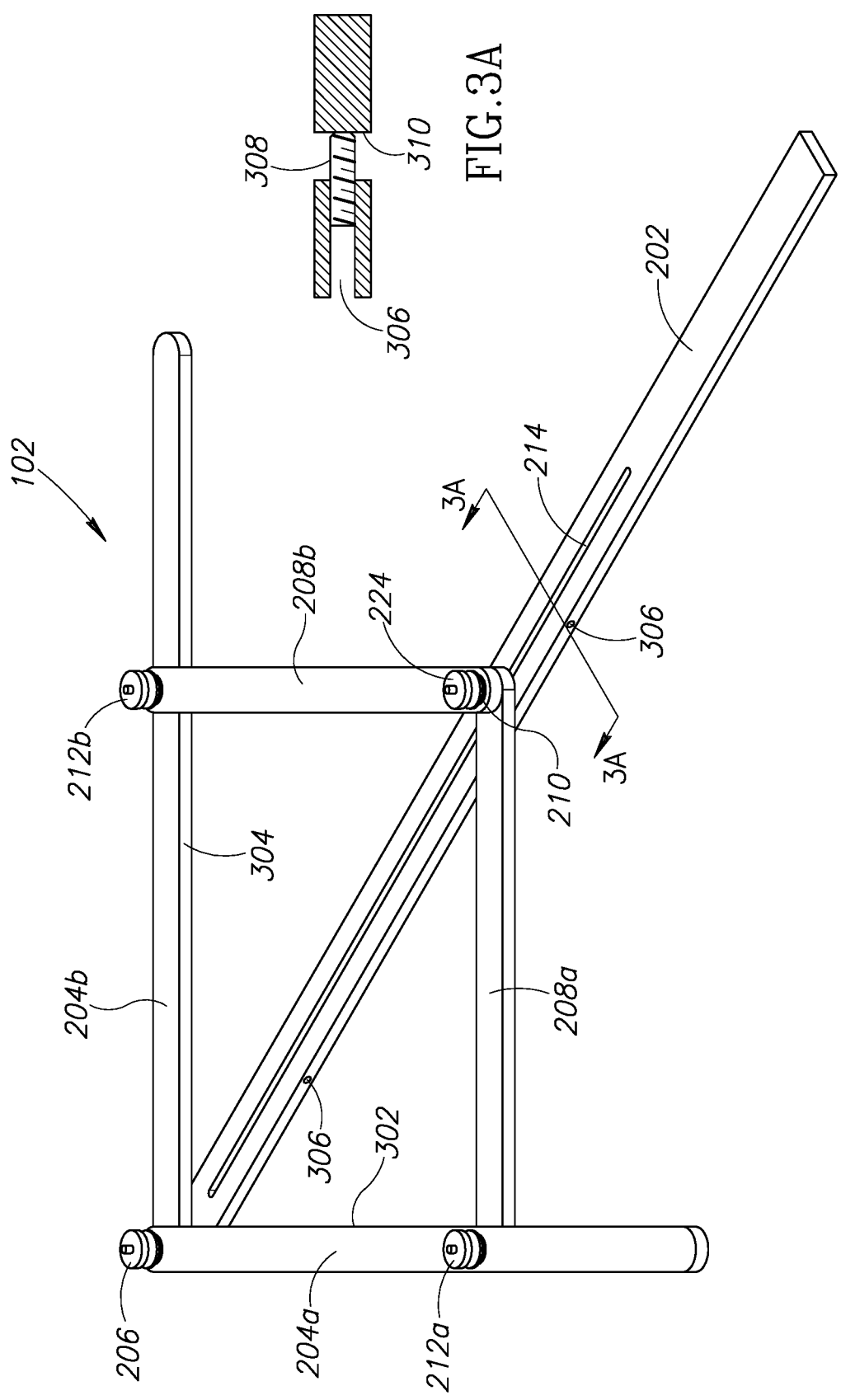
FIG. 3 is a perspective illustration of another example of an angle bisector gauge.

With reference to FIGS. 2 and 3, examples of an angle bisector gauge 102 are illustrated. A guide bar 202 supports a pair of angle arms 204a, 204b that are pivotable about a distal connector 206. The angle arms 204a, 204b, are connected to each other by the distal connector 206, and form a vertex of an angle θ formed by the angle arms 204a, 204b. A pair of support arms 208a, 208b are pivotally connected at their ends at a sliding connector 210. The angle arms 204a, 204b are pivotally connected to the support arms 208a, 208b at a lateral connector 212a, 212b. The distal connector 206, the sliding connector 210, and the lateral connectors 212a, 212b, are each preferably configured to allow the angle arms 204a, 204b, and the support arms 208a, 208b to pivot relative to one another.

The guide bar 202 may be configured with a slot 214 that allows a sliding engagement with the sliding connector 210. For example, the sliding connector 210 may be a post, pin, threaded rod, screw, or other such connector that can pass through the slot 214 of the guide bar 202, and pass through appropriately sized holes in the support members 208a, 208b. The slot 214 may also be formed as a T-slot or other such configuration to allow the functionality described herein. The sliding connector 210 may further be configured with threads to provide a threaded engagement with a retaining member 224 such as a knurled knob, a wing nut, or other suitable retaining member 224. In use, once the retaining member 224 is sufficiently loosened, the sliding connector 210 can be repositioned within the slot 214, which will cause a change in the angle θ as the support arms 204a, 204b, pivot about the distal connector 206. Once the retaining member 224 is tightened sufficiently, further movement of the angle arms 204a, 204b, and support arms 208a, 208b will be inhibited.

Each of the angle arms 204a, 204b is pivotally attached at its respective ends at the distal connector 206 and the lateral connector 212a, 212b. The distance between the distal connector 206 and the lateral connector 212a, 212b is preferably equal, or very nearly equal for both of the angle arms 204a, 204b. That is, distance A 216 is preferably equal to distance B 218.

Similarly, each of the support arms 208a, 208b is pivotally attached at its respective ends at the sliding connector 210 and the lateral connectors 212a, 212b. The distance between the sliding connector 210 and the lateral connectors 212a, 212b is equal, or very nearly equal, for both of the support arms 208a, 208b. In other words, distance C 220 is equal to distance D 222. This provides symmetry about the guide bar 202 such that the guide bar 202 will bisect the angle θ formed by the angle arms 204a, 204b.

While it is preferable that distance A 216 and distance B 218 are equal, and distance C 220 and distance D 222 are equal, they do not all need to be equal to each other. For instance, in some embodiments, distance A 216 is not equal to distance C 220 or distance D 222. In these embodiments, the angle arms 204a, 204b and the support arms 208a, 208b form the geometric shape known as a kite, a quadrilateral in which two pairs of adjacent sides are equal. In some cases, where all four sides of the kite have the same length, the kite is a special case known as a rhombus. For example, where the distances A 216, B 218, C 220, and D 220 are all equal, the angle arms 204a, 204b and the support arms 208a, 208b form a rhombus shape in which the sides are all equal, opposites sides remain parallel, and opposite angles remain equal throughout the adjustment range. Many of the advantages of the angle bisector gauge 102 are provided by the fact that the angle arms 204a, 204b and support arms 208a, 208b form a quadrilateral that has an axis of symmetry along one of its diagonals. As shown in the figures, the symmetry of the angle bisector gauge 102 is along the guide bar 202.

The distal connector 206, sliding connector 210, and the lateral connectors 212a, 212b (collectively "connectors") provide for pivotal movement of the angle arms 204a, 204b, and the support arms 208a, 208b at their connections. This may be accomplished by any suitable mechanism, but in some instances is accomplished by a post, screw, pin, or other suitable device that has a generally circular cross section to allow pivotal movement about the axis of the connector. The connectors may further have a mechanism whereby the connector may be loosened, such as by turning a threaded fastener, such as a nut, knob, or other suitable device.

The angle bisector gauge 102 may be formed of any suitable material. However, some exemplary materials include wood, plastic, metal, composites, including combinations of materials. It may also include sleeves or inserts within each connector (e.g., brass, aluminum, or plastic sleeves), to establish tight tolerances and maintain the durability and the accuracy of the angle bisector gauge 102.

A slot adjustment mechanism may be incorporated into the guide bar 202, such as by forming an aperture 306 into the side of the guide bar 202. As shown in FIG. 3a, an aperture 306 may be formed into the side of the guide bar 202 at one or more locations. The aperture 306 may be configured to receive a threaded fastener 308, such as a set screw.

The set screw 308 may be advanced into the aperture 306 until it contacts an inner wall 310 of the slot 212. By advancing the set screw 308 until it impinges upon the inner wall 310 of the slot, the set screw can be used to effectively widen the gap formed by the slot 212. This has the result of expanding the width of the guide bar 202 in the vicinity of the set screw 308.

Not all miter slots formed in the tables of power tools are machined perfectly equally. In addition, the materials that are used to form the angle bisector gauge 102 described herein may change due to moisture or temperature effects. The set screw 308 thus allows for adjustability in the width of the guide bar 202 so that it can be finely adjusted to maintain a tight fit within a miter slot.

Alternative methods for adjusting the width of the guide bar 202 include forcing a wedge into the slot, having an extension that attaches to the guide bar 202 and is adjustable to extend beyond the edge of the guide bar 202 to contact the wall of the miter slot, incorporating a cam mechanism that extends away from the guide bar 202, among others. In any event, some embodiments include a way to adjust the fit of the guide bar 202 within the miter slot of a tool to provide for a tight fit with little slop while allowing the guide bar 202 to slide along the miter slot.

Figure 4:
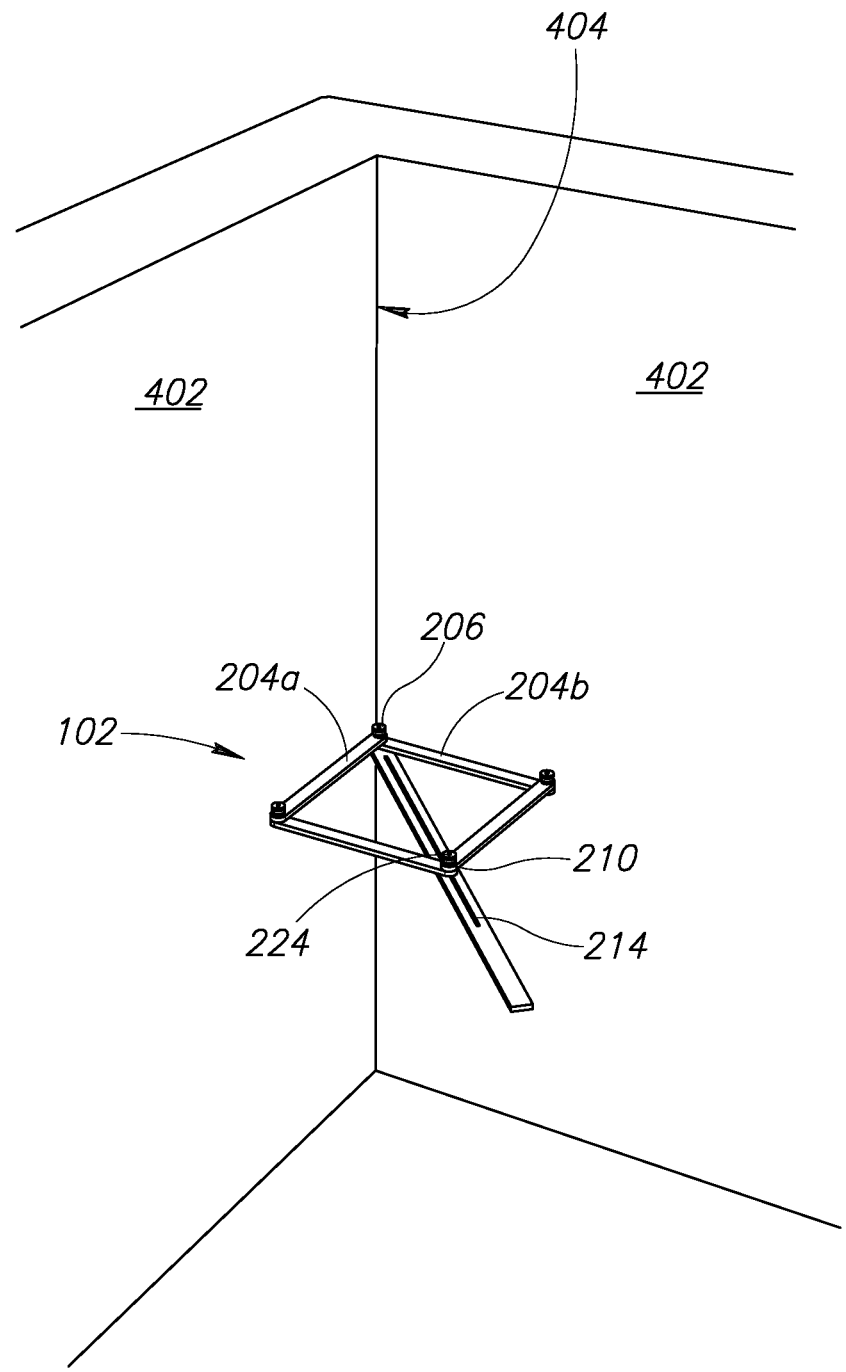
FIG. 4 is perspective illustration of an angle bisector gauge conforming to a corner having an unknown angle.

FIG. 4 shows the angle bisector gauge 102 conforming to an interior angle formed by two intersecting walls 402. The retaining member 224 may be loosened and the angle bisector gauge 102 can be placed into the corner 404 and the sliding connector 210 is advanced within the slot 214 to cause the angle arms 204a, 204b to pivot about the distal connector 206 until the angle arms 204a, 204b come into surface contact with the walls 402. In this way, the device angle θ conforms to the angle 404 formed by the intersection of the walls 402. The retaining member 224 can be tightened to inhibit further movement of the angle arms 204a, 204b. Additionally, each of the lateral connectors 212a, 212b, and/or the distal connector 206 can have similar retaining members 224 which can be tightened down to inhibit movement to thereby lock the angle bisector gauge 102 into a fixed configuration. The angle bisector gauge 102 can subsequently be used on a cutting tool to cut the appropriate miter angles. Because of the symmetry of the angle bisector gauge 102, the guide bar 202 will necessarily bisect the angle θ established by the relative position of the angle arms 204a, 204b.

An optional protractor scale, such as a Vernier scale, can be provided on the guide bar to show the angle formed by the angle arms 204a, 204b. While it may not be necessary to know the measurement of the angle formed by the angle arms 204a, 204b, it can be helpful for repeating an angle previously set, or used as a measurement tool. The protractor scale can be added toward the distal connector 206 to indicate the angle of the angle arms 204a, 204b, or in those instances in which the connectors are equidistant from each other, and there is equality with distance A 216, distance B 218, distance C 220, and distance D 222, the optional protractor scale can be positioned near the sliding connector 210 since the geometry in this configuration provides that the angle formed by the support arms 208a, 208b at the sliding connector 210 is equal to the angle θ formed by the angle arms 204a, 204b at the distal connector 206.

In some embodiments, such as one shown in FIG. 1, the guide bar 202 is sized and configured to ride within the miter slot 118 of a table saw 104. In this way, the angle bisector gauge 102 is used as a miter gauge with a table saw 104 and a workpiece 116 can be placed against one of the angle arms 204a, 204b and pushed, along with the angle bisector gauge 102, past the spinning blade 106 of the table saw 104 to make the appropriate miter cut.

In order to make the complementary miter cut, the workpiece 116 can either be turned upside down and flipped end for end in order to make the appropriate miter cut on the other end of the workpiece 116, or alternatively, the guide bar 202 can be positioned within the miter slot 108 on the other side of the blade 106 of the table saw 104. Optional sacrificial fences can be attached to the angle arms 204a, 204b such as for providing positive stops to allow for accurate repeated cuts, or for providing a zero clearance fence to support the workpiece 116 and/or to reduce tear out.

Some of the benefits provided by the angle bisector gauge 102 described herein are that there is no measuring of angles required and no machine setup required to reproduce the desired angle. The angle bisector gauge 102 accurately conforms to the desired angle, bisects the angle, and can be used to guide the workpiece 116 past a cutting blade 106 to make the angled cut required for a tight fitting mitered joint.

As another example, a worker may desire to construct a seven-sided picture frame. A regular heptagon (i.e., one in which all sides are equal length and all angles are equal), has seven angles that are each 5π/7 radians, or 128.571°. When making a mitered frame around the heptagon, each miter cut can be cut at 64.286° in order to produce tight fitting mitered joints around the heptagon. It can be very difficult to get precise results with traditional methods, especially when many machines or miter gauges only provide resolution to the nearest degree (or even the nearest tenth of a degree). In this example, the angle bisector gauge 102 can be adjusted to match the angles of the heptagon without any measuring or calculating and then used to cut the workpieces 116. The angle θ formed by the angle arms 204a, 204b will be equal (or very nearly equal) to the internal angle of the heptagon, or 128.571°, and the guide bar 202 will bisect the angle thereby allowing for an accurate cut at 64.286° or very near to the desired angle either by using the angle bisector gauge 102 as a miter gauge sliding in the miter slot 108 of a table saw 104 and guiding the workpiece 116, or by aligning the slot 214 with the blade of a table saw 104 and setting the miter gauge fence 114 to match the angle provided by the angle bisector gauge 102.

A skilled worker will recognize that accuracy to the thousandth of a degree may not be possible with every wood working tool. For example, there are tolerances in the alignment of the miter slots 108, 116 to one another, and additional tolerances in the alignment of the miter slots to the blade 106 of a table saw 104. While many table saws 104 allow alignment adjustment of the blade 106, such as by adjusting a trunnion, adjusting the trunnion such that the blade 106 is within 0.001" of the miter slots over any appreciable distance may not be feasible. Consequently, while the present disclosure discusses cutting angles accurately to the thousandth of a degree, there are limitations on the accuracy inherent in the tools used for cutting.

The angle bisector gauge 102 can optionally be used to conform to outside corners. For example, in the case of creating a picture frame around an object having an irregular polygonal shape, in other words, a polygon that is not equiangular or equilateral, the inside edge 302, 304 of the angle arms 204a, 204b can be abutted against the object to transfer the angle of the corner of the object to the angle bisector gauge 102. As previously described, the angle bisector gauge 102 can then be used to accurately cut workpieces 116 that will cooperate to form tight fitting mitered joints around the periphery of the object.

Figure 5:
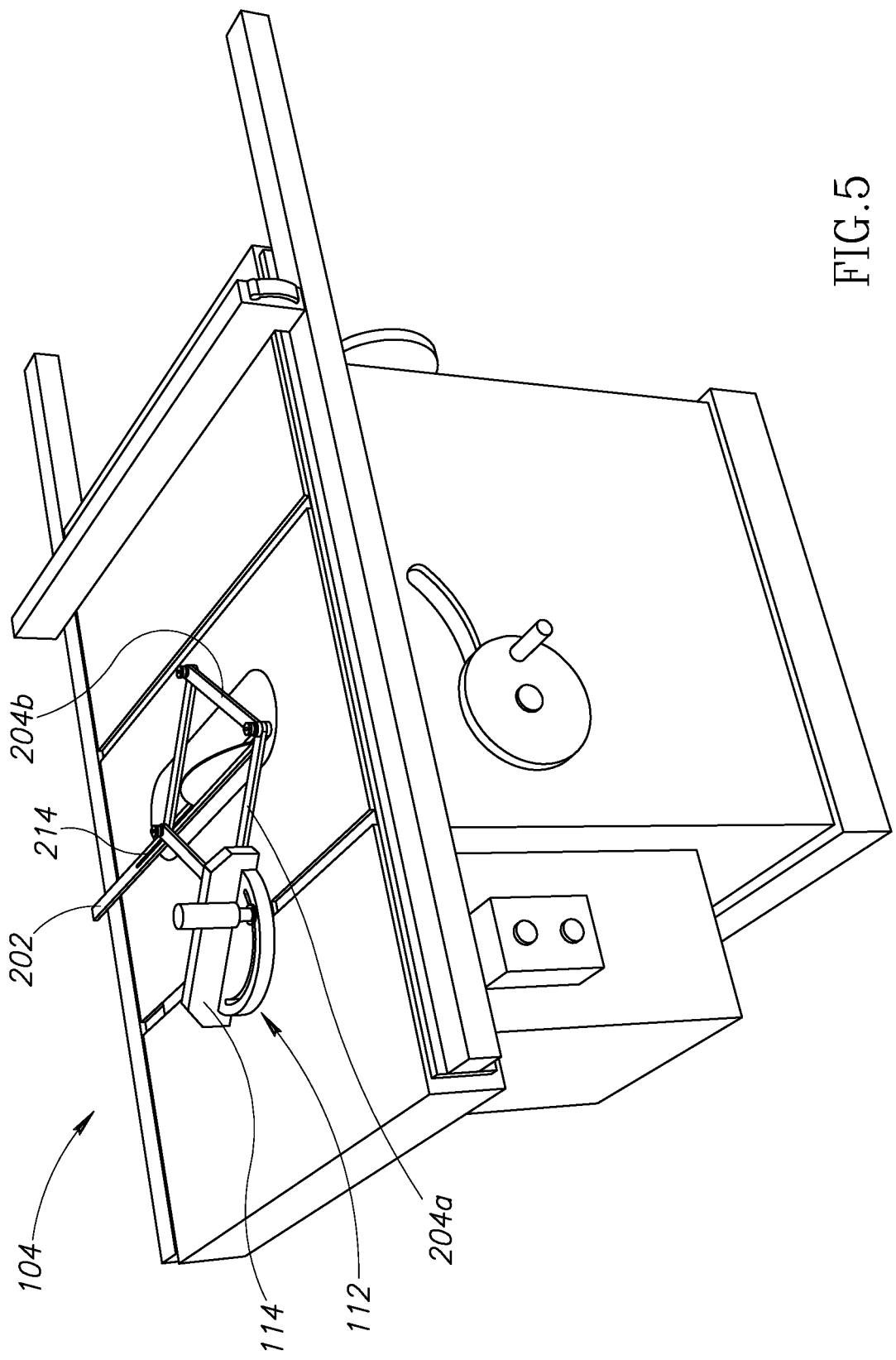
FIG. 5 is a perspective illustration of an angle bisector gauge being used to adjust a miter gauge on a table saw.

With reference to FIG. 5 and according to another use for the angle bisector gauge, the slot 214 in the guide bar 202 may be fitted over the blade 106 of the table saw 104. In practice, most blades 106 designed for table saws 104 are either full kerf blades having a blade thickness of 1/8", or are thin-kerf blades which typically have a blade thickness of 3/32". The slot 214 may be appropriately sized to fit over a blade 106 of a table saw 104, thus aligning the angle bisector gauge 102 with the blade 106 of the table saw 104. Once in this position, any suitable miter gauge 112 can be positioned adjacent the angle bisector gauge 102 and the miter gauge fence 114 can be adjusted to match the angle arm 204a of the angle bisector gauge 102. The miter gauge 112 can then be used to make repeatable cuts at the appropriate angle as desired, without the worker ever needing to know the measurement of the angle or the measurement of the miter cut necessary to make a suitable mitered joint. Of course, the angle bisector gauge 102 could also be placed in a miter slot 108, and the miter gauge 112 can be positioned in the same miter slot 108 and brought into contact with the angle bisector gauge 102 and adjusted such that the miter gauge fence 114 aligns with the angle arm 204a. In any event, rather than measuring an angle and attempting to adjust the tool to the proper angle, the desired angle is simply transferred to the tool without any measuring, thus obviating much of the inaccuracy inherent in typical mitered joint processes.

Figure 6:
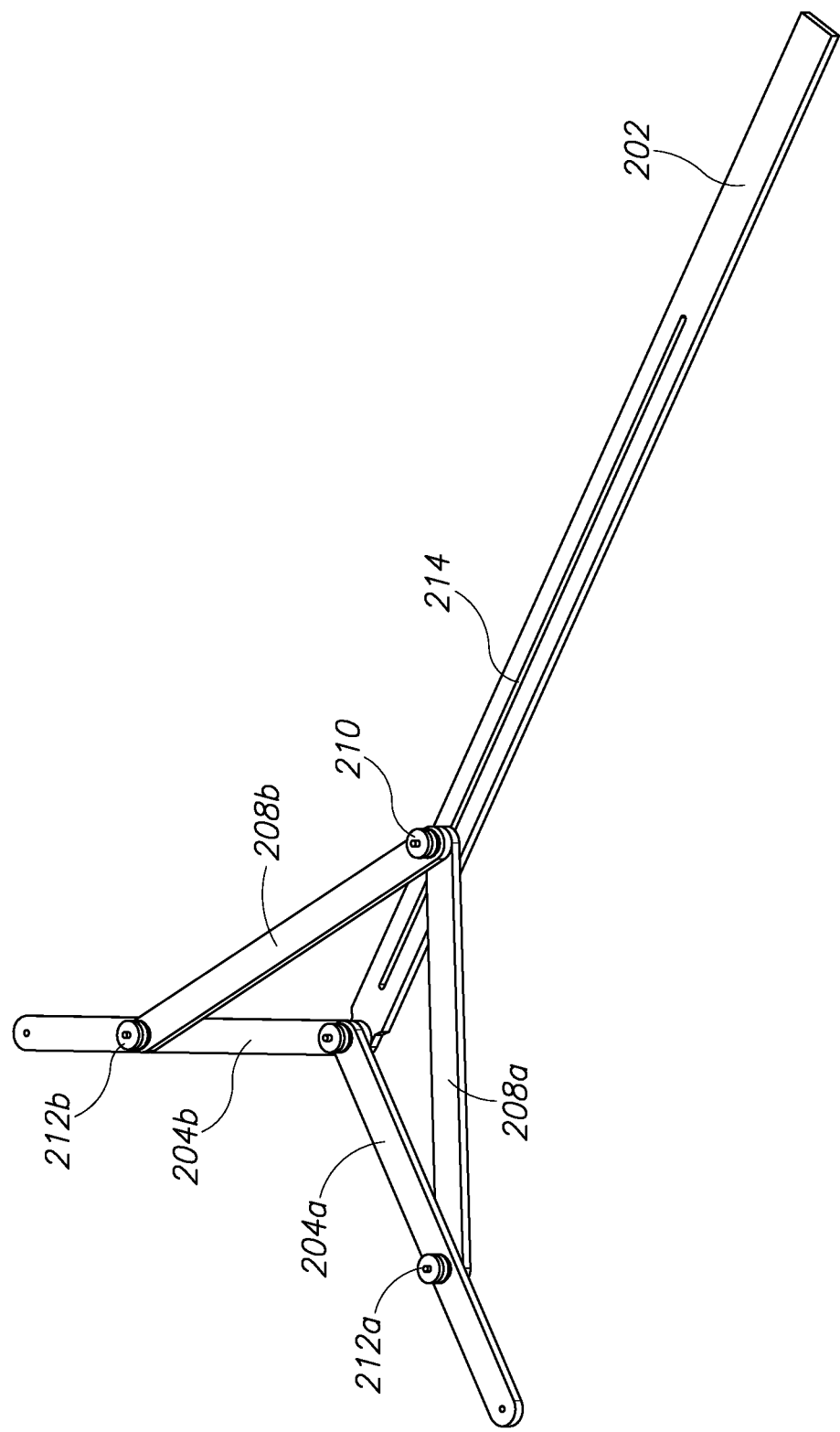
FIG. 6 is a perspective illustration of an angle bisector gauge in an alternate configuration for measuring outside corners.

With reference to FIG. 6, and additional reference to FIG. 2, the angle bisector gauge 102 can be used to measure outside corners of objects. One example is the outside corner formed by two intersecting walls. Another example is the outside corner of an object, such as a stone or canvas, that may need to be measured for a mitered joint.

By adjusting the location of the lateral connectors 212a, 212b, the support arms 208a, 208b can advance the angle arms 204a, 204b to a position that is beyond 180° and effectively configure the device to measure outside corners. This is possible by making the dimensions C 220 and D 222 longer than the dimensions A 216 and B 218. The angle bisector device 102 may include a plurality of positions at which to mount the lateral connectors 212a, 212b to provide for adjustability in the configuration of the device.

Many woodworking and metalworking tools incorporate horizontal tables with grooves formed therein for guiding miter gauges and other jigs and/or fixtures. The angle bisector gauge 102 described herein can be used with practically any tool that provides a slot within the table. For example, some common tools such as, but not limited to, band saws, router tables, molding machines, sanders (e.g., disk, belt, spindle, etc.), and shapers, to name a few, incorporate miter slots to allow a worker to use a miter gauge to guide a workpiece to a blade or an abrasion material to shape the workpiece.

Moreover, the angle bisector gauge 102 described herein may also be used with tools that do not provide a miter slot. For example, a miter saw does not typically include a miter slot. Nevertheless, the angle bisector gauge 102 can be used to adjust the angle of cut on a miter saw to effectively arrive at an infinite variety of desired angled cuts. The guide bar 202 can be aligned with a fence on the miter saw, and the blade can be pivoted until it aligns with one of the angle arms 204a, 204b. In this way, the angle that the angle bisector gauge 102 is set to can be transferred directly to the miter saw without any measuring or guessing.

While the disclosure herein has used exemplary tools, materials, and techniques, it will be appreciated that the concepts disclosed herein may be applied to other materials, tools, and used according to other techniques without departing from the spirit and scope of the overall invention. Accordingly, the innovative ideas presented herein should be limited only by the claims that follow, and not by any examples provided.

What is claimed is:

1. A method of forming a mitered joint at a corner, comprising:
    using an angle measurement tool having at least two arms and a guide bar connected thereto, conforming the at least two arms to a desired angle by abutting the angle measurement tool against the corner;
    aligning the angle measurement tool to a blade of a saw, the saw being affixed to a table having a slot that extends across a surface thereof, wherein aligning the angle measurement tool includes positioning the guide bar within the slot on the table;
    advancing a first workpiece, using the angle measurement tool, to the blade to cut the first workpiece;
    advancing a second workpiece; using the angle measurement tool, to the blade to cut the second workpiece;
    joining the first workpiece to the second workpiece to create the desired mitered joint.

2. The method of claim 1, further comprising, after conforming the at least two arms to the desired angle, inhibiting further relative movement between the at least two arms by tightening a threaded fastener on the angle measurement tool.

3. The method of claim 1, further comprising adjusting a width of the guide bar to fit tightly within the slot.

4. The method of claim 1, further comprising fixing the angle measurement tool in an orientation of the desired angle.

* * * * *